United States Patent [19]

Payton et al.

[11] 4,168,485
[45] Sep. 18, 1979

[54] SIMULTANEOUS USE OF PSEUDO-RANDOM CONTROL SIGNALS IN VIBRATIONAL EXPLORATION METHODS

[75] Inventors: Charles E. Payton; Kenneth H. Waters; Pierre L. Goupillaud, all of Ponca City, Okla.

[73] Assignee: Continental Oil Company, Ponca City, Okla.

[21] Appl. No.: 701,411

[22] Filed: Jun. 30, 1976

Related U.S. Application Data

[63] Continuation-in-part of Ser. No. 496,689, Aug. 12, 1974, abandoned.

[51] Int. Cl.² .................... G01V 1/22; G01V 1/14
[52] U.S. Cl. ........................... 367/41; 367/42; 367/189
[58] Field of Search ............ 340/15.5 TA, 15.5 CC, 340/17 R, 15.5 SC; 181/108, 139

[56] References Cited

U.S. PATENT DOCUMENTS

| | | | |
|---|---|---|---|
| 2,808,577 | 10/1957 | Crawford et al. | 340/15.5 TA |
| 3,185,958 | 5/1965 | Masterson et al. | 340/15.5 |
| 3,288,243 | 11/1969 | Silverman | 181/401 |
| 3,587,039 | 6/1971 | Backus et al. | 340/15.5 TA |
| 3,697,938 | 10/1972 | Taner | 340/15.5 TA |
| 3,968,471 | 7/1976 | Savit | 340/15.5 CP |
| 4,004,267 | 1/1977 | Mayne . | |

FOREIGN PATENT DOCUMENTS 1913875  10/1970  Fed. Rep. of Germany ... 340/15.5 SC

OTHER PUBLICATIONS

Sosie, A New Seismic Method, 40th Annual International SEG Meeting (11/12/70), Barbier, pp. 1-23.

Primary Examiner—Samuel W. Engle
Assistant Examiner—S. A. Cangialosi
Attorney, Agent, or Firm—William J. Miller

[57] ABSTRACT

A method for deriving seismic information through the simultaneous operation of a plurality of vibrational seismic energy source systems such that the information produced by each source system may be separated from the combined recorded information.

9 Claims, 8 Drawing Figures

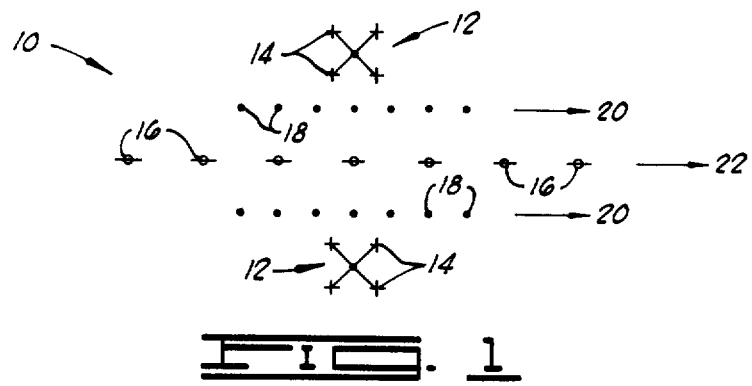
FIG. 1
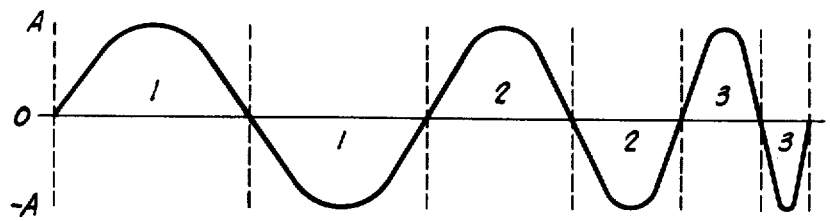
FIG. 2
4 , 7 , 8 , 3 , 1 , 9 , 6 , 2 , .... (RANDOM)
2 , 2 , 3 , 1 , 2 , 1 , 1 , 3 (NORMALIZED)
FIG. 3
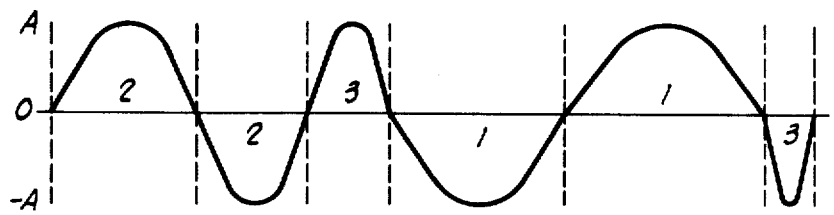
FIG. 4

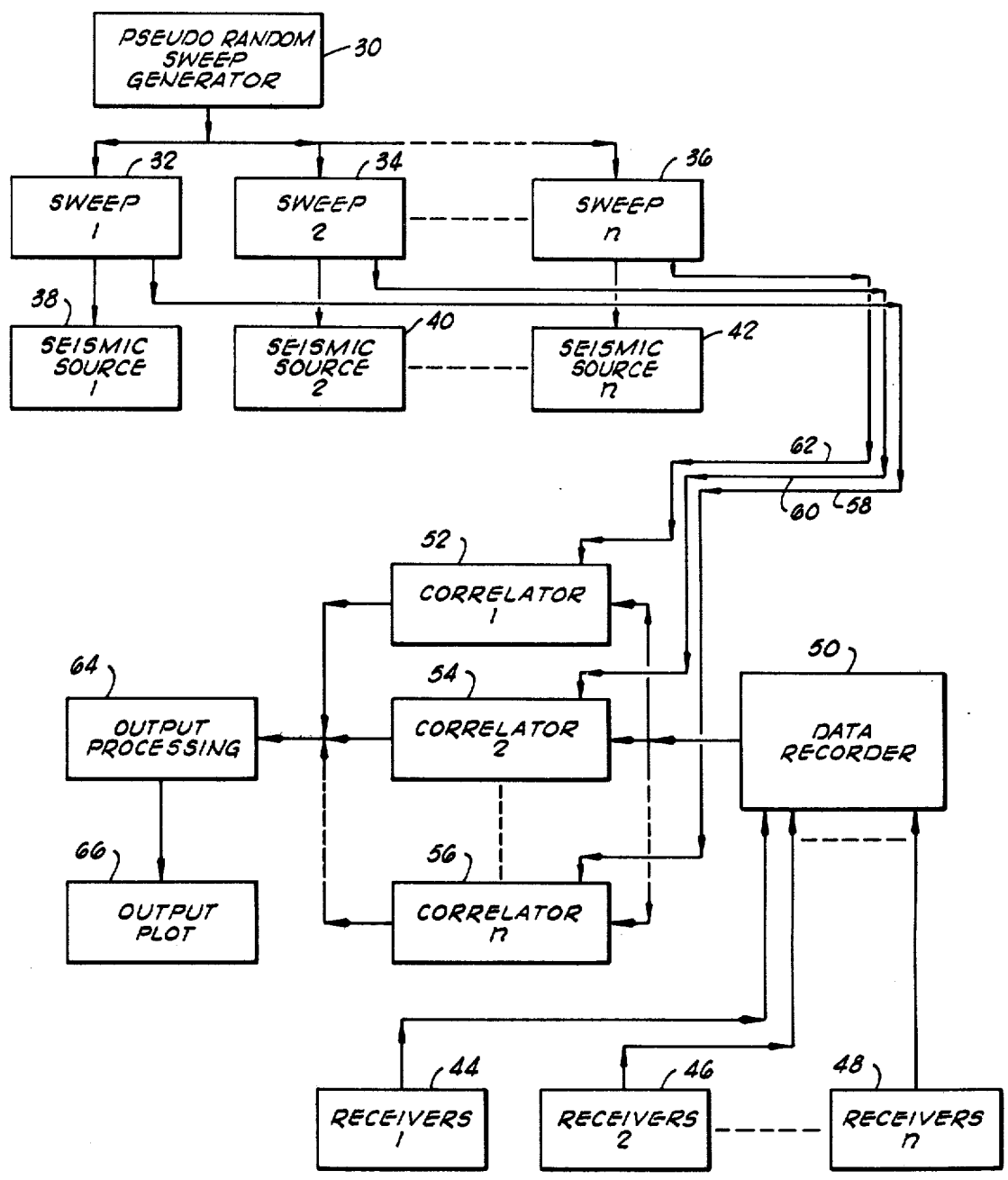

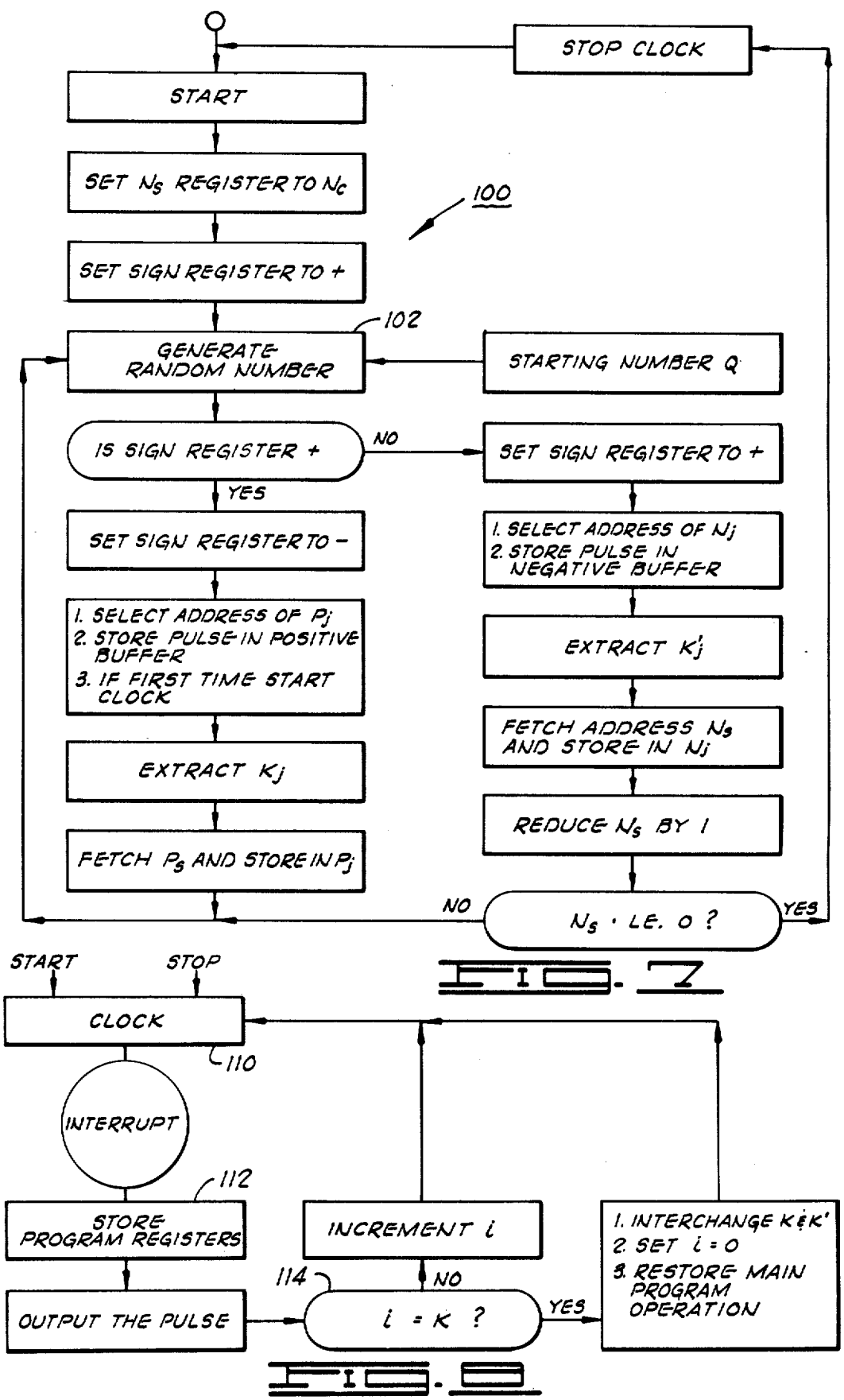

SIMULTANEOUS USE OF PSEUDO-RANDOM CONTROL SIGNALS IN VIBRATIONAL EXPLORATION METHODS

CROSS-REFERENCE TO CO-PENDING APPLICATION

The present application is a continuation-in-part application to United States Patent Application Ser. No. 496,689 entitled "Simultaneous Use of Pseudo-Random Control Signals in Vibrational Exploration Methods" as filed on Aug. 12, 1974 under common inventorship, now abandoned.

BACKGROUND OF THE INVENTION

1. Field of the Invention

This invention relates generally to geophysical prospecting systems and, more particularly, but not by way of limitation, to improvements in seismic prospecting methods wherein seismic information can be derived through the simultaneous operation of a plurality of vibrational seismic energy sources whereby the information produced by each source is separable from the combined recorded information.

2. Description of the Prior Art

The use of vibrational seismic energy sources is well known in the art. Present applications make use of vibrators which are controlled by a control signal whose frequency varies over a predetermined band-width of frequencies, such as a linear sweep. Subsequent correlation of the recorded seismic information with the known sweep gives an impulse equivalent seismogram. The use of the linear sweep, however, prevents the simultaneous operation of more than one vibrator or system of vibrators with the same sweep in the same geologic neighborhood, since the energy from one system will produce correlatable interference with the energy from any other operating system. It is desirable, therefore, to control each system with a distinctive continuous control signal so that the effects due to the operation of each system can be correlated out of the sum effects of all operating systems. Such a method would secure the economic benefits derived from more efficient survey operations which are obtainable with pulse sources when utilizing the pulse coding method described in "Pulse Coding in Seismic Prospecting Sosie and Seiscode" by M. G. Barbier and J. R. Viallix in the March 1974 issue of Geophysical Prospecting, Vol. 22, No. 1, pp. 153-175.

BRIEF DESCRIPTION OF THE DRAWINGS

FIG. 1 illustrates a vibrational seismic energy system configured in accordance with the present invention;

FIG. 2 is a sample linear sweep vibrator control signal;

FIG. 3 is a series of random numbers normalized to the range 1-3;

FIG. 4 is a distinctive control signal derived from FIG. 2 using the series of numbers of FIG. 3;

FIG. 6 is a block diagram of digital equipment which may be utilized to carry out the present invention;

FIG. 7 is a flow diagram of a main control computer program which may be utilized in carrying out the present invention; and FIG. 8 is a flow diagram of the output program of the present invention.

DESCRIPTION OF THE PREFERRED EMBODIMENT

Figure 5:
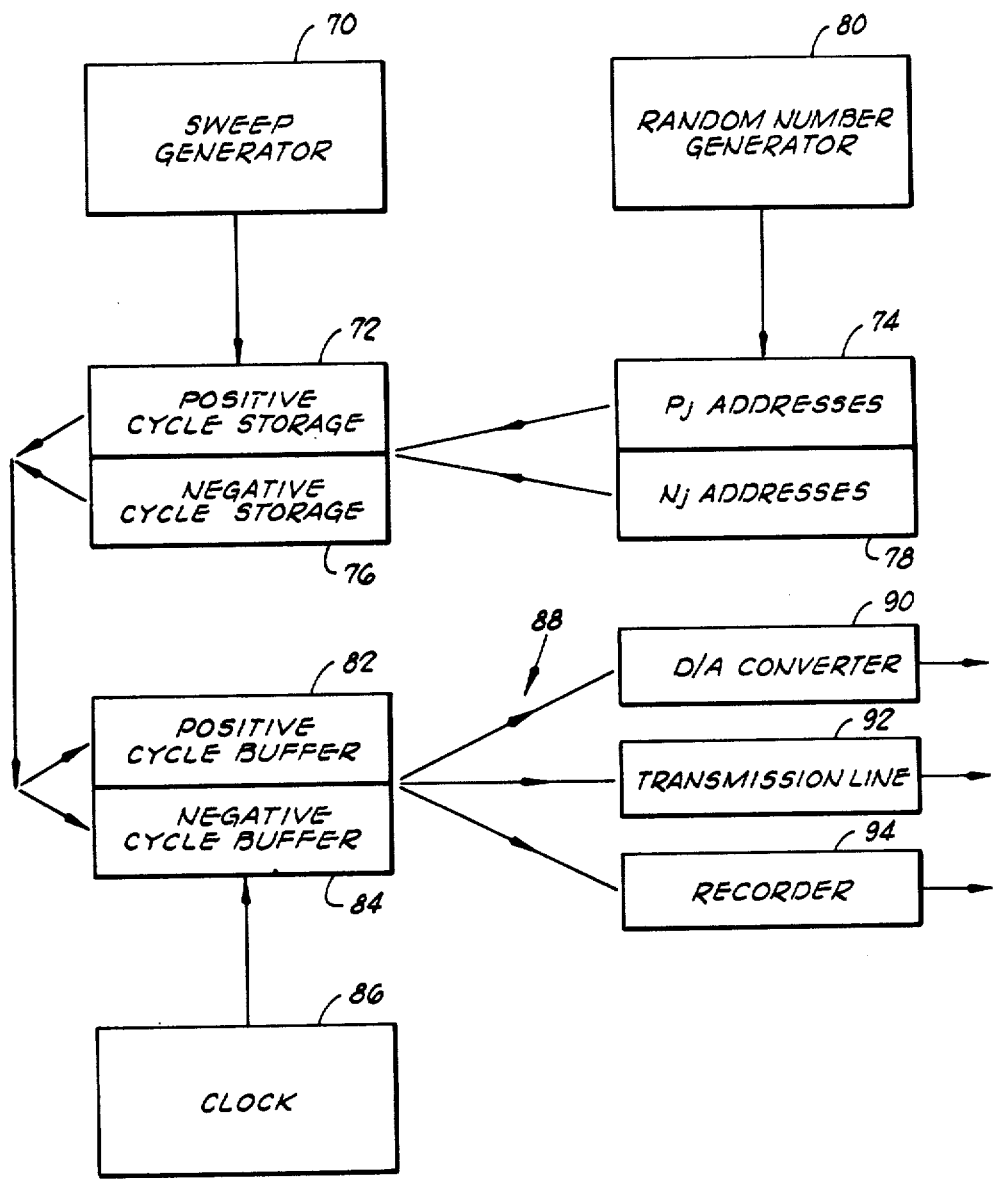
FIG. 5 is a block diagram of seismic source and receiver equipment as may be utilized in the field to carry out the present invention.

This invention pertains to a method whereby a plurality of vibrational seismic energy source systems, each having at least one vibrator, and an associated geophone array of sharing common geophone arrays, may be simultaneously operated along the same line of survey or different lines of survey within the same geologic neighborhood. For the purpose of this description, two source systems may be considered as being within the same geologic neighborhood when the seismic energy generated by one operating system is detected and recorded by the receivers associated with the other system. The present invention envisions the utilization of any of a variety of conventional vibrational source and receiver apparatus configured and operated in accordance with any of the well-known survey techniques, such as that taught in U.S. Pat. No. 2,688,124 entitled "Method of and Apparatus for Determining Travel Time of Signals" issued Aug. 31, 1954 to W. E. N. Doty et al.

FIG. 1 illustrates the application of the present invention to a vibrational seismic energy survey system 10 comprised of two source systems 12, each having a plurality of vibrators 14 which are operated in unison under the control of the same control signal. Associated with the source systems 12 in an array of seismic energy receivers 16 (or nests or receivers). In conventional survey methods, the systems 12 are operated one at a time to derive data points 18 along one of the lines 20 which lie parallel to the line of survey 22. Since the systems 12 in the conventional methods utilize the same control signal, any attempt to operate the systems 12 simultaneously results in correlatable interference or crosstalk between the systems 12. To prevent this crosstalk, distinctive control signals may be constructed for each system 12 using one of the techniques of the present invention which are described below.

The present invention relates particularly to a method wherein each vibrational source system is controlled by a distinctive sweep or control signal so that the data produced by each system can be effectively separated from the aggregate of all the recorded seismic energy using conventional correlation techniques. Such a set of distinctive control signals, $S_i$, should satisfy the following conditions:

$$C(\tau) = \int_0^T S_n(t) S_m(t - \tau) dt \approx 0 \text{ for all } \tau \quad (1)$$

$$A(\tau) = \int_0^T S_n(t) S_n(t - \tau) dt \quad (2)$$

wherein $C(\tau)$ is a crosscorrelation function of any two different control signals $S_n$ and $S_m$; and $A(\tau)$ is an autocorrelation function of the control signal $S_n$.

Although not necessary, it is sufficient for the purpose of this description to assume that the amplitude spectrum of each of the control signals $S_i$, is the same. Therefore, their autocorrelation functions are also the same. Since condition (1) implies that the crosscorrelation function between any two different control signals at all delays is almost equal to zero, it follows that the crosscorrelation function should be much less than that of the autocorrelation function or $$|C(\tau)| << A(o) \text{ for all } \tau \quad (3)$$

This implies that each control signal will correlate with its corresponding component of the aggregate signal with a high signal to noise ratio. The effectiveness of the present invention, therefore, depends upon how well the set of control signals $S_i$, satisfies conditions (1), (2) and (3).

While it is theoretically possible to control the vibratory sources using random noise, filtered to provide a selected band-width of desired vibrator control signal frequency, it is now possible with existing equipment to construct an optimum pseudo-random signal which provides good response and correlation input. The "pseudo" random number technique of the present invention makes it possible to produce a plurality of distinctive control signals having the same energy spectrum but different phase spectra which satisfy the required conditions.

Using one of a number of well-known techniques applicable to both analog and digital computational devices, a series of random numbers can be produced to act as a large band-width random signal wherein the random numbers represent signal amplitude and the resulting control signal can be band-limited using a zero phase filter with the requisite band-width and spectral shape, preferably flat. However, for efficiency, the random number generation process should be designed to produce relatively few members outside the desired band-width in order to minimize the probability of any one generated number falling outside the band-width and thus being wasted.

Alternatively, the series of random numbers may be used to determine indirectly the characteristics of the control signals. For example, if the amplitude of each frequency within the desired band-width is set at a predetermined value such as 1.0, then the phase angle $\theta_f$, of each succeeding frequency of a control signal could be determined as follows:

$$\theta_f = \pi(2n_f - N)/N \text{ for } n_f \leq N$$

wherein:
 $\theta_f$ = the phase angle of successive frequencies of a control signal.
 $n_f$ = a random number generated for frequency f.
 N = the maximum of the range of random numbers, $n_f$.

Another method is to randomize the ratio between the real, $R_f$, and imaginary $I_f$, parts of the amplitude, $A_f$, as follows:

$$A_f = (R_f^2 + I_f^2)^{\frac{1}{2}}$$

$$R_f = n_f/N$$

$$I_f = \pm(1 - R_f^2)^{\frac{1}{2}}$$

Still another and presently preferred method is to separate a control signal, such as the linear sweep, into a series of signal segments and randomly combining the segments to form distinctive control signals. For example, a conventional digital or analog sampling technique may be used to delineate and separate each successive half cycle, with each positive half cycle being numbered consecutively beginning with a predetermined starting number, for reference purposes, and similarly the negative half cycles. A series of random numbers can then be produced using such well known analog means as sampling selected portions of a real time clock or the conventional digital method of power progression from a predetermined "seed" value. For efficiency reasons, the series of random numbers should then be normalized to the range between the starting number assigned to the first delineated half cycle and the number assigned to the last delineated half cycle so as to minimize the number of random numbers falling outside this range and therefore wasted. The normalization may be accomplished by dividing each of the series of random numbers by the total number of delineated positive (or negative) half cycles and utilizing the sum of the remainder plus one (1). This normalized series of random numbers can be generally referred to as a series of "pseudo" random numbers. The series of normalized or "pseudo" random numbers may then be used to select half cycles from the series of numbered positive and negative half cycles alternately until all of the half cycles have been used to construct a distinctive continuous control signal composed of "pseudo" randomly selected half cycles of alternating polarity (i.e. positive, negative, positive, etc.). In order to assure that all of the constructed "pseudo" random control signals are of the same length and spectrum as the original control signal, each delineated half cycle should be selected only one time for each constructed control signal and the alternating polarity pattern maintained. Since each half cycle is complete, there are no phase compensation difficulties except those associated with the sudden change of slope at each zero crossing. These slope changes may be removed by filtering with a zero phase band pass filter. The computational processing may be performed using analog or digital devices in the field for immediate use or may be performed elsewhere and a control tape constructed for subsequent field use.

To illustrate the method of half cycles, the control signal of FIG. 2 has been separated into half cycles and the cycles number consecutively. A series of random numbers is then generated and normalized to the available number of half cycles to produce a series of "pseudo" random numbers such as shown in FIG. 2. This series of numbers is used to select, alternately, half cycles from the sets of positive and negative half cycles, which are then combined in the selected order to produce the distinctive control signal as shown in FIG. 4. Note that each half cycle is used only once regardless of how many time its reference number is generated, in order to insure uniform time duration control signals. A much more efficient method would be to renumber consecutively, the sets of half-cycles remaining after each selection and normalizing each random number generated to the remaining number of half-cycles. Thus, if N is the total number of positive half-cycles in the original sweep and n selections have already been made, (n − n) half-cycles are left in the set and these are numbered 1 to (N − n). The next random number generated for this set would then be normalized to (N − n).

It should be noted that the results obtained in the use of these pseudo-randomly constructed control signals improves as the time duration of a control signal increases. That is, the ratios of the peak amplitude of the autocorrelation function for each control signal to the average crosscorrelation amplitude should be made as high as possible. This ratio will vary as the square root of the time duration of the control signal.

FIG. 5 illustrates a block diagram of one form of field setup which may be utilized in the present invention wherein a plurality 1 through n of distinctive pseudo-random signals utilized for vibrator control and subsequent correlation of received signals. A pseudo-random sweep generator 30, as will be further described below, is utilized to generate the 1 through n distinctive pseudo-random sweep signals. This may be done in the field, or pseudo-random sweep signals from generator 30 may be pre-generated and prerecorded for transport to the field for use in controlling a plurality of seismic sources or vibrators. In the illustration, the 1 through n pseudo-random sweep signals, of predetermined frequency range and duration, are each pre-constructed and stored in suitable storage mechanism identified as sweep storage 32, 34 and 36 whereupon they are then applied for field activation of the respective vibrators or seismic sources 38, 40 and 42.

Particular reference is made to the U.S. Pat. No. 3,440,599 of K. H. Waters, et al. as issued on Apr. 22, 1969, and entitled "Digitally Controlled Vibrational Seismic Prospecting", wherein digital control of a seismic energy vibrator is fully disclosed. The patent provides teaching for the use of a digital computer, either in the field or in laboratory, with recorded control signal output, for constructing an optimum vibrator control signal having the desired frequency content, amplitude and/or duration, which is then utilized to provide optimum control of vibrational energy into the earth. Such structure could be fully utilized for pseudo-random sweep generation and vibrator control in accordance with the present invention, and includes the further teachings of receiving the subsurface vibrational energy return for correlation and processing within the same digital computer which was utilized to generate the optimum input signals, i.e., a plurality of pseudo-random vibrator control signals.

Referring again to FIG. 5, each of seismic sources 38, 40 through 42, whatever the plurality, may be energized simultaneously with each being energized by a distinctive pseudo-random control signal. The energy input to the earth subsurface is then received after reflection and/or refraction by each of a plurality of receivers 44, 46 through 48, whatever the plurality, for subsequent surface processing. It should be understood too that receivers 44, 46 and 48 constitute surface layouts of geophones and/or geophone arrays which are deployed in conventional manner to gain optimum subsurface coverage for a given shot sequence or duration. Received signal output from receivers 44, 46 and 48 are then applied to a multi-channel data recorder 50 which then supplies output upon control switching to each of a plurality of correlators 52, 54 and 56, whatever the plurality required. Once again, supplied as input to the respective correlators 52, 54 and 56 are the original control pseudo-random sweep signals by means of replica signal outputs 58, 60 and 62 to the respective correlators. The function of correlators 52, 54 and 56 is then to distinguish those received subsurface signals as those emanating from a selected one of the vibrators or seismic sources 38, 40 or 42 for subsequent output processing. The outputs of correlators 52, 54 and 56 are then available to output processing stage 64 whereupon any of numerous and conventional further processing manipulations may take place for eventual output to output plot stage 66 in well-known manner.

As previously stated, pseudo-random sweep generator 30 may take any of numerous forms and would be readily carried out utilizing the equipment illustrated in the Waters et al. U.S. Pat. No. 3,440,599, aforementioned. However, advancements in equipmentation and routine programming have made available numerous mini-computer or micro-processor digital signal generators which may be both adequate and desirable for the job. For example, the model 980 computer which is commercially available from Texas Instruments of Dallas, Texas may be readily utilized as an installation on board the field equipment truck. Such computational equipment may be utilized to provide a basic random pulse output through a band pass filter, but present indications are that the more refined method of generating a pseudo-random signal, as particularly illustrated in FIGS. 2 through 4, will provide best vibrator control and geophone response correlation.

Thus, FIG. 6 illustrates in basic block form the components of a digital computer which function to generate 1 through n of the desired pseudo-random control signals. The programmed digital machine is capable of generating and outputting in real time a control signal which has the characteristics of being pseudo-random in nature. It should be understood, too, that this may be done by using either a programmed mini-computer or by the use of special purpose hard-wired digital circuitry which performs the same functions, either of which is well within the skill of the geophysical artisan.

First, a sweep generator 70 of conventional type is utilized to generate a conventional form of vibrator control signal of required frequency, amplitude and duration, e.g., such as the type of signal disclosed in the U.S. Pat. No. 2,688,124 in the name of Doty et al. The output from sweep generator 70 will be a conventional linear sweep and it is then input to the digital device to store the positive and negative cycle signals in order in fast access storage 72 and 76 in the form $$K_j \ldots A_{1j} \ldots A_{2j} \ldots A_{ij} \ldots A_{kj}$$

where kj is the number of samples at a selected or standard sampling rate, and $A_{1j}, A_{2j}, \ldots A_{ij}$ through $A_{kj}$ are the amplitudes of those samples in the $j^{th}$ cycle. Simultaneously, the addresses within positive cycle storage 72 are compiled in a table or $P_j$ addresses list 74; and, during the same operation, the negative half cycles of the output control signal from sweep generator 70 as stored in fast access random storage 76 are compiled in the same format in the address table identified as $N_j$ addresses list 78.

A value $N_c$, which will be equal to the total number of positive cycles to be treated, is then set manually into the digital device. A starting member Q, e.g., four digits, is then entered, and from Q, a random number is generated in random generator 80 by any of several known processes. For example, random number generation can be effected by forming $Q^2$ which will be equal to an eight digit number, and then selecting out the first random number as the center four digits of the eight digit number. This random number will then range from 0 through 9999 and may be readily scaled to 0 is than $Q_i$ is less than $N_s$; which equals $N_{c-i+1}$ where $N_s$ is equal to $N_c$ initially, but is reduced by one every time both a positive and a negative half cycle has been chosen. This number then serves as the locator $j$ in the tables $P_j$ and $N_j$ and in the address lists 74 and 78 to find the next pulse whether it is positive or negative. As a positive or negative pulse from storage 72 or 76 is output, the last address in the $P_j$ and $N_j$ address lists 74 and 78 is moved to fill the gap, i.e. to over play the one already used. In this manner, the address lists 74 and 78 remain a consecutive listing of addresses, but of decreasing length.

The positive or negative cycle data from storage 72 or 76 is then moved through a positive cycle buffer 82 or negative cycle buffer 84 under control of an external clock 86 which functions at a selected sampling rate to control output on lines 88. The clocked output from buffers 82 and 84 constitute $K_j$ pulses as clocked out under control of clock 86 and may then be provided by lines 88 to a digital to analog converter 90, or to a transmission line 92, or to a digital recorder 94 for subsequent control usage. This sequence of pulses, as taken alternately from positive and negative buffers 82 and 84 will then constitute the pseudo-random sweep. It is output in real time and can then control the output of one or a set of vibrators for vibrational seismic prospecting. A subsequent pseudo-random control signal may then be generated by restoring the address lists for 74 and 78 and selecting a new set of random numbers for generation from random number generator 80. The sequence can then be run to generate as many pseudo-random control signals as needed for direct output to vibrator control, library storage, digital to analog conversion, etc.

FIG. 7 illustrates a basic digital machine program which may be readily installed for control of a minicomputer such as the Texas Instruments Model 980 to effect generation of pseudo-random vibrator control signals. The program of FIG. 7 is self-explanatory to the artisan, and is drawn in the same reference terms as the functional computer block diagram of FIG. 6. Thus, operation is begun by setting the sign and pulse number registers as indicated in stages 100. Then, address selection of positive and negative half cycle data is selected in accordance with a generated random number from stage 102. Thereafter, under control of the sign register, alternately positive and negative indication, the address of a respectively selected $P_j$ or $N_j$ half cycle pulse data is stored in the respective positive or negative buffers for clocked output. The half cycles are continually reduced per unit operation so that no single half cycle can be repeated in output, and the program finally queries as to whether or not $N_s$ is left to zero. If so, the clock is stopped to complete output of a particular pseudo-random control signal.

Output of the pseudo-random control signal is further controlled by the output program of FIG. 8. Clock control stage 110 effects interrupt to enable storage of the program registers in flow stage 112, with subsequent output of each $i^{th}$ pulse within a half cycle data group. A decision stage 114 queries as to whether all k of the i pulses have been output, and increments to output the next $i^{th}$ pulse if not. When all k of the i pulses are output, the program then functions to set i to zero, signify the change of k, and to restore the main program operation and clock 110.

Changes may be made in the order and techniques of the steps and the method as disclosed herein without departing from the spirit and scope of the invention as defined in the following claims.

What is claimed is:

1. A method of producing and processing seismic data by the simultaneous operation, within the same geologic neighborhood, of a plurality of vibrational seismic energy source systems and associated seismic energy receivers, each source system having at least one vibrational seismic energy source, comprising the steps of:

positioning a plurality of vibrational seismic energy source systems and associated seismic energy receivers at predetermined locations along at least one selected line of survey within the same geologic neighborhood;

constructing a distinctive control signal of non-linear pseudo-random character having predetermined frequency content and time duration for each of a predetermined number of said plurality of source systems, each of said distinctive control signals having the same amplitude spectrum and therefore the same autocorrelation functions;

simultaneously operating at least two of said predetermined number of said plurality of source systems, each according to a distinctive control signal;

recording all of the returned seismic energy generated by the plurality of simultaneously operating source systems; and, processing said recorded seismic energy so that the seismic data produced by each of the plurality of simultaneously operating source systems is separated by correlation from the recorded seismic energy.

2. The method of claim 1 wherein the step of constructing a distinctive control signal having predetermined frequency content and time duration for each of a predetermined number of said plurality of source systems is further characterized as including the steps of:

generating a series of random numbers; and constructing a distinctive control signal comprised of a continuous alternating signal whose amplitude is a function of said series of random numbers.

3. The method of claim 1 wherein the step of constructing a distinctive control signal having predetermined frequency content and time duration for each of a predetermined number of said plurality of source systems is further characterized as including the steps of:

generating a series of random numbers, $n_f$, wherein $0 \leq n_f \leq N$; and constructing a distinctive control signal comprised of a continuous alternating signal of predetermined amplitude wherein the phase angle, $\theta_f$, of each succeeding frequency of said control signal is a function of said series of random numbers according to the relation $$\theta_f = \pi(2n_f - N)/N.$$

4. The method of claim 1 wherein the step of constructing a distinctive control signal having predetermined frequency content and time duration for each of a predetermined number of said plurality of source systems is further characterized as including the steps of:

generating a series of random numbers, $n_f$, wherein $0 \leq n_f \leq N$; and constructing a distinctive control signal comprised of a continuous alternating signal wherein the ratio of the real, $R_f$, and the imaginary, $I_f$, parts of the amplitude, $A_f$, is a function of said series of random numbers according to the relations $$A_f = (R_f^2 + I_f^2)^{\frac{1}{2}}$$

$$R_f = n_f/N$$

$$I_f = \pm(1-R_f^2)^{\frac{1}{2}}.$$

5. The method of claim 1 wherein the step of constructing a distinctive control signal having predetermined frequency content and time duration for each of a predetermined number of said plurality of source systems is further characterized as including the steps of:

constructing a continuous alternating control signal of predetermined time duration having predetermined frequency content;

separating said control signal into a predetermined number of signal segments; and constructing a distinctive control signal by randomly combining end to end said signal segments.

6. A method for constructing a distinctive control signal, having predetermined frequency content and time duration, for controlling the energization of a vibrational seismic energy source system having at least one vibrational seismic energy source, comprising the steps of:

generating a series of random numbers; and constructing a distinctive control signal comprised of a continuous alternating signal whose amplitude is a function of said series of random numbers.

7. A method for constructing a distinctive control signal, having predetermined frequency content and time duration, for controlling the energization of a vibrational seismic energy source system having at least one vibrational seismic energy source, comprising the steps:

generating a series of random numbers, $n_f$, wherein $0 \leq n_f \leq N$; and constructing a distinctive control signal comprised of a continuous alternating signal of predetermined amplitude wherein the phase angle, $\theta_f$, of each succeeding frequency of said control signal is a function of said series of random numbers according to the relation $$\theta_f = \pi(2n_f - N)/N.$$

8. A method for constructing a distinctive control signal, having predetermined frequency content and time duration, for controlling the energization of a vibrational seismic energy source system having at least one vibrational seismic energy source, comprising the steps of:

generating a series of random numbers, $n_f$, wherein $0 \leq n_f \leq N$; and constructing a distinctive control signal comprised of a continuous alternating signal wherein the ratio of the real, $R_f$, and the imaginary, $I_f$, parts of the amplitude, $A_f$, is a function of said series of random numbers according to the relations $$A_f = (R_f^2 + I_f^2)^{\frac{1}{2}}$$

$$R_f = n_f/N$$

$$I_f = \pm(1-R_f^2)^{\frac{1}{2}}.$$

9. A method for constructing a distinctive control signal, having predetermined frequency content and time duration, for controlling the energization of a vibrational seismic energy source system having at least one vibrational seismic energy source, comprising the steps of:

constructing a continuous alternating control signal of predetermined time duration having predetermined frequency content;

separating said control signal into a predetermined number of signal segments; and constructing a distinctive control signal by randomly combining end to end said signal segments.

* * * * *